United States Patent
Makled et al.

(10) Patent No.: US 10,060,369 B2
(45) Date of Patent: Aug. 28, 2018

(54) METHOD FOR HUMIDITY MEASUREMENT ENABLEMENT

(71) Applicant: Ford Global Technologies, LLC, Dearborn, MI (US)

(72) Inventors: Daniel A. Makled, Dearborn, MI (US); Gopichandra Surnilla, West Bloomfield, MI (US); Richard E. Soltis, Saline, MI (US); Michael McQuillen, Warren, MI (US); Mohannad Hakeem, Dearborn, MI (US); Lyth Alobiedat, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 14/863,281

(22) Filed: Sep. 23, 2015

(65) Prior Publication Data

US 2017/0082045 A1    Mar. 23, 2017

(51) Int. Cl.
*F02D 41/02* (2006.01)
*F02D 35/00* (2006.01)
(Continued)

(52) U.S. Cl.
CPC ........... *F02D 41/021* (2013.01); *F02D 35/00* (2013.01); *F02D 35/0007* (2013.01); *F02D 37/02* (2013.01); *F02D 41/005* (2013.01); *F02D 41/0077* (2013.01); *F02D 41/1456* (2013.01); *F02D 41/2406* (2013.01);
(Continued)

(58) Field of Classification Search
CPC ........ F02D 41/0047–41/0057; F02D 41/0077; F02D 2041/1472; F02D 2200/0418; F02D 1/00; F02D 1/16; F02D 3/00; F02D 2009/0225; F02D 2009/0227; F02D 13/00–13/0257; F02D 35/00–35/0092; F02D 41/00; F02D 41/0002; F02D 41/021; F02D 2041/001; F02D 2041/0017; F02D 2041/002; F02P 5/00; F02P 5/04; F02P 5/045; F02P 5/14; F02M 2026/003; F02M 2026/004

USPC ............... 701/103–109; 123/406.12, 406.55, 123/568.11, 568.21–568.22, 677, 678, 123/90.11, 90.15

See application file for complete search history.

(56) References Cited

U.S. PATENT DOCUMENTS

| | | | |
|---|---|---|---|
| 5,735,245 A * | 4/1998 | Kubesh | F02D 37/02 123/406.55 |
| 6,725,848 B2 * | 4/2004 | Ramamurthy | F02D 41/005 123/568.22 |

(Continued)

OTHER PUBLICATIONS

Makled, Daniel A. et al., "Methods and System for Fuel Ethanol Content Estimation and Engine Control," U.S. Appl. No. 14/626,623, filed Feb. 9, 2015, 68 pages.

*Primary Examiner* — Erick Solis
*Assistant Examiner* — Robert Werner
(74) *Attorney, Agent, or Firm* — Julia Voutyras; McCoy Russell LLP

(57) ABSTRACT

Methods and systems are provided for triggering a humidity measurement based on changes in ambient conditions. In one example, a method may include, in response to a higher than threshold change in ambient air temperature or pressure, operating an oxygen sensor to update an ambient humidity estimate. Engine operation parameters may be adjusted based on the updated ambient humidity estimate.

18 Claims, 5 Drawing Sheets

(51) Int. Cl.
  *F02D 41/00* (2006.01)
  *F02D 41/24* (2006.01)
  *F02D 41/26* (2006.01)
  *F02M 35/10* (2006.01)
  *F02D 41/14* (2006.01)
  *F02D 37/02* (2006.01)

(52) U.S. Cl.
  CPC ....... *F02D 41/26* (2013.01); *F02M 35/10393* (2013.01); *F02D 2200/0418* (2013.01); *F02D 2200/70* (2013.01); *Y02T 10/47* (2013.01)

(56) References Cited

U.S. PATENT DOCUMENTS

| | | | | |
|---|---|---|---|---|
| 7,246,604 B2 * | 7/2007 | Cullen | ...................... | F01L 1/34 123/491 |
| 7,715,976 B1 * | 5/2010 | Xiao | .................. | F02D 41/0072 123/406.48 |
| 7,895,851 B2 | 3/2011 | Bianchi et al. | | |
| 8,296,042 B2 * | 10/2012 | Xiao | ..................... | F02D 41/146 123/481 |
| 8,763,594 B2 | 7/2014 | Surnilla et al. | | |
| 8,910,476 B2 * | 12/2014 | Nam | .................. | F02M 25/0227 123/406.55 |
| 9,057,330 B2 * | 6/2015 | Surnilla | .................. | F02D 17/02 |
| 9,109,523 B2 * | 8/2015 | Surnilla | .............. | F02D 41/0055 |
| 9,188,056 B2 * | 11/2015 | Glugla | ................ | F02B 29/0406 |
| 9,273,621 B2 * | 3/2016 | Surnilla | ................ | F02D 41/005 |
| 2011/0132340 A1 * | 6/2011 | Soltis | ................. | F02D 41/0025 123/703 |
| 2012/0227714 A1 | 9/2012 | Surnilla et al. | | |
| 2013/0118232 A1 * | 5/2013 | Auckenthaler | ........ | G01N 19/10 73/29.02 |
| 2013/0332050 A1 * | 12/2013 | Song | ..................... | F02D 41/144 701/104 |
| 2014/0014079 A1 * | 1/2014 | Yacoub | ................. | F02D 41/144 123/568.16 |
| 2014/0202426 A1 | 7/2014 | Surnilla et al. | | |
| 2014/0316676 A1 | 10/2014 | Pursifull et al. | | |

* cited by examiner

METHOD FOR HUMIDITY MEASUREMENT ENABLEMENT

FIELD

The present description relates generally to methods and systems for triggering a humidity measurement.

BACKGROUND/SUMMARY

Engine systems include a variety of sensors for measuring ambient conditions, such as ambient temperature, pressure, and humidity. Based on the ambient conditions, one or more engine operating parameters may be adjusted to optimize engine performance. For example, based on ambient humidity (that is, the humidity in the air charge received in the engine), parameters such as an amount of exhaust gas recirculation (EGR), spark timing, and combustion air-fuel ratio may be adjusted.

Various kinds of sensors may be used to estimate the ambient humidity. As one example, oxygen sensors, such as a Universal Exhaust Gas Oxygen (UEGO) sensor used for exhaust air-fuel ratio control, may be used for ambient humidity estimation under selected conditions. Such oxygen sensors can be located in an exhaust passage or an intake air passage. In one example, shown by Surnilla et al. in US 20140202426, an exhaust gas oxygen sensor coupled to an engine bank may be utilized to opportunistically determine ambient humidity during conditions when the bank is selectively deactivated, and while the other bank continues to combust. A variable voltage may be applied to the sensor, and a change in pumping current may be correlated with the ambient humidity. In still other examples, humidity is estimated by a dedicated humidity sensor, such as shown by Surnilla et al. in US 20120227714. Therein the humidity sensor is positioned in an intake passage, downstream of an EGR valve.

The inventors herein have recognized potential issues with the above systems. As one example, humidity measurement conditions may be non-specific. In some cases, ambient humidity is estimated opportunistically, when possible. In still other cases, ambient humidity may be estimated when a humidity estimate is required. This can result in unnecessary humidity measurements. In the approach of Surnilla where an exhaust oxygen sensor is used for humidity sensing, the frequent application of a variable voltage to the sensor for the unnecessary humidity measurements can result in sensor blackening, and eventual degradation. In other cases, opportunistic humidity sensing can result in infrequent humidity estimation. Therein, engine operations may continue to be adjusted based on a most recent humidity estimate. However, in between the opportunistic humidity estimations, there may be changes in ambient conditions which affect the ambient humidity. For example, there may be a change in ambient temperature which affects the amount of water that an engine intake aircharge is able to contain, thereby changing the ambient humidity. Likewise, there may be a change in barometric pressure (e.g., due to a change in altitude of vehicle engine operation) that affects the ambient humidity. As such, if the ambient humidity estimate is not sensed or updated when there is a significant change in ambient conditions, engine performance may be degraded. For example, if there is a significant rise in ambient temperature since the most recent humidity sensing, ambient humidity may be over-estimated. This results in EGR being under-delivered, leading to increased NOx emissions and degraded fuel economy.

The inventors herein have identified an approach by which the issue described above may be at least partly addressed. One example method for a vehicle engine comprises: in response to a higher than threshold change in ambient air temperature or pressure, operating an oxygen sensor to update an ambient humidity estimate; and adjusting an engine actuator based on the updated ambient humidity estimate. In this way, humidity measurements may be triggered during specific conditions.

As an example, ambient conditions of a vehicle engine may be continually monitored and used to trigger humidity sensing. A change in the ambient temperature may include a change in the outside air temperature (OAT) as measured by an OAT sensor coupled to an outside of the vehicle. Alternatively, the change in ambient temperature may be inferred based upon a change in the air charge temperature (ACT) or intake air temperature (IAT) as measured by an IAT sensor coupled to an engine intake passage. A change in ambient temperature may be based on an absolute signal output by the above-mentioned temperature sensors, or a change (or derivative) in the output of the sensors. If a difference between the current ambient temperature and the ambient temperature at the last known humidity measurement is significant (e.g., higher than a threshold), it may be determined that ambient humidity may have changed significantly too, and. accordingly, a humidity measurement is triggered. Herein, humidity sensing may be performed via any one of an intake oxygen sensor, an exhaust gas oxygen sensor, and a (dedicated) humidity sensor. In the same way, a significant change in ambient pressure may be used to trigger a humidity measurement. Further still, ambient humidity sensing may be triggered if a threshold duration or distance of engine operation has elapsed since a last sensing.

In this way, changes in ambient conditions that may influence ambient air humidity may be monitored and used to trigger humidity sensing. By actively sensing humidity during conditions when humidity is expected to have significantly changed, rather than (or in addition to) opportunistically sensing humidity when possible, a more accurate and reliable humidity estimate may be provided for engine control. The technical effect of using a change in ambient temperature and pressure, along with other conditions, to trigger humidity measurement is that a humidity estimate can be updated when a substantial change in humidity is expected, reducing any unnecessary humidity measurements. In addition, in engine systems where an oxygen sensor is used for humidity estimation, the selective sensing of humidity when the specific trigger conditions are met decreases the chances of sensor degradation due to blackening from the applying of a variable voltage, and increases component life. By enabling a more reliable and up-to-date humidity estimate to be provided, engine operation can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for humidity measurement using an oxygen sensor, triggered by change in ambient conditions that may have an influence on humidity. Humidity sensing may be performed via oxygen sensors disposed in an intake air passage or an exhaust gas passage, as shown in the vehicle system of FIG. 1. FIG. 2 shows a schematic view of an oxygen sensor, that may be used to estimate the ambient humidity during selected conditions. An engine controller may be configured to perform a control routine, such as the example routine of FIG. 3, to determine if a humidity measurement needs to be triggered based on a change in ambient conditions. Accordingly, the engine controller may estimate a current humidity, such as using an oxygen sensor, as described in the example method of FIG. 4. An example triggering of humidity measurement and corresponding adjustment of engine operation is shown in FIG. 5.

Figure 1:
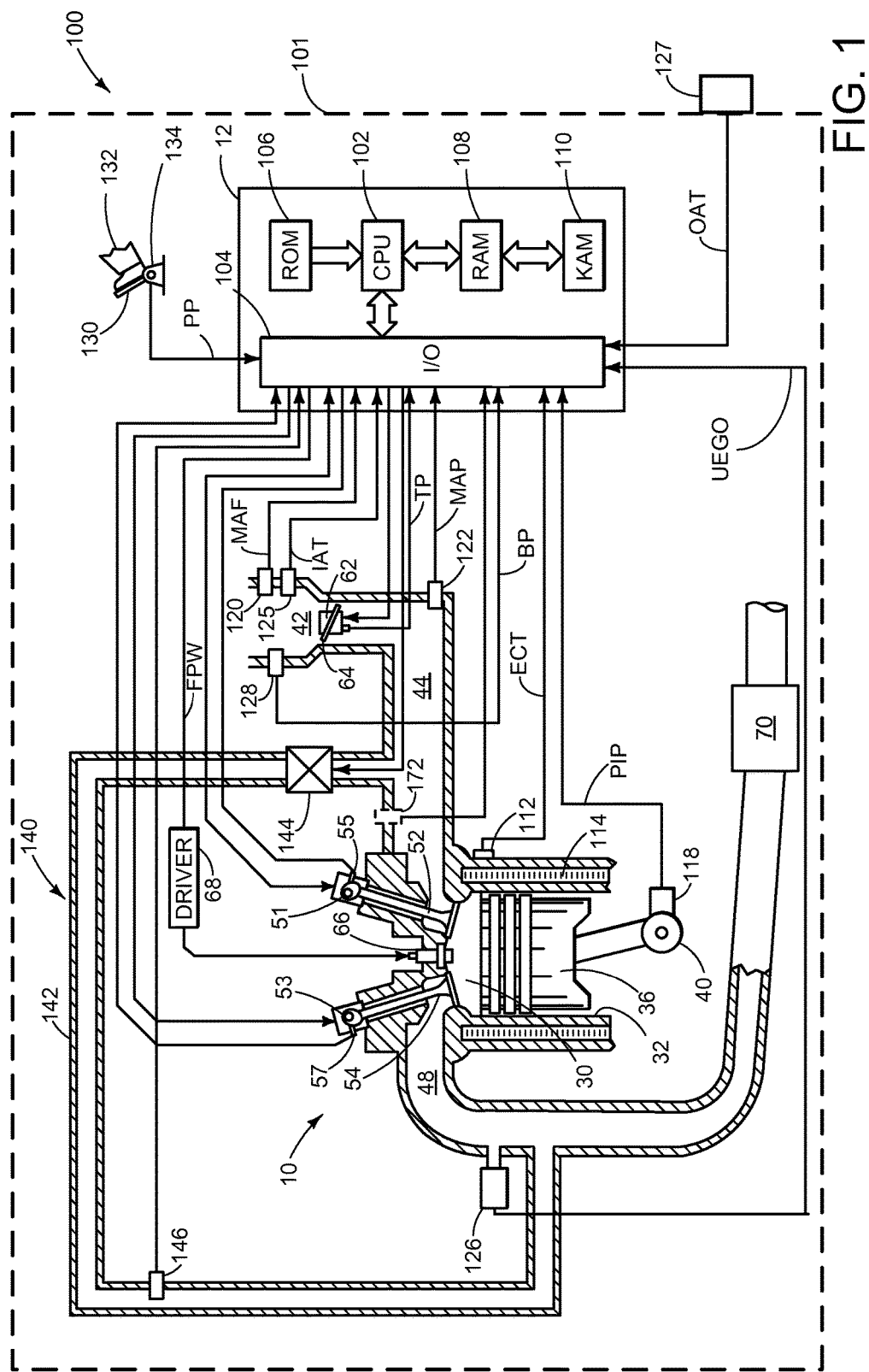
FIG. 1 shows an example engine system including oxygen sensors for measuring humidity.
Figure 2:
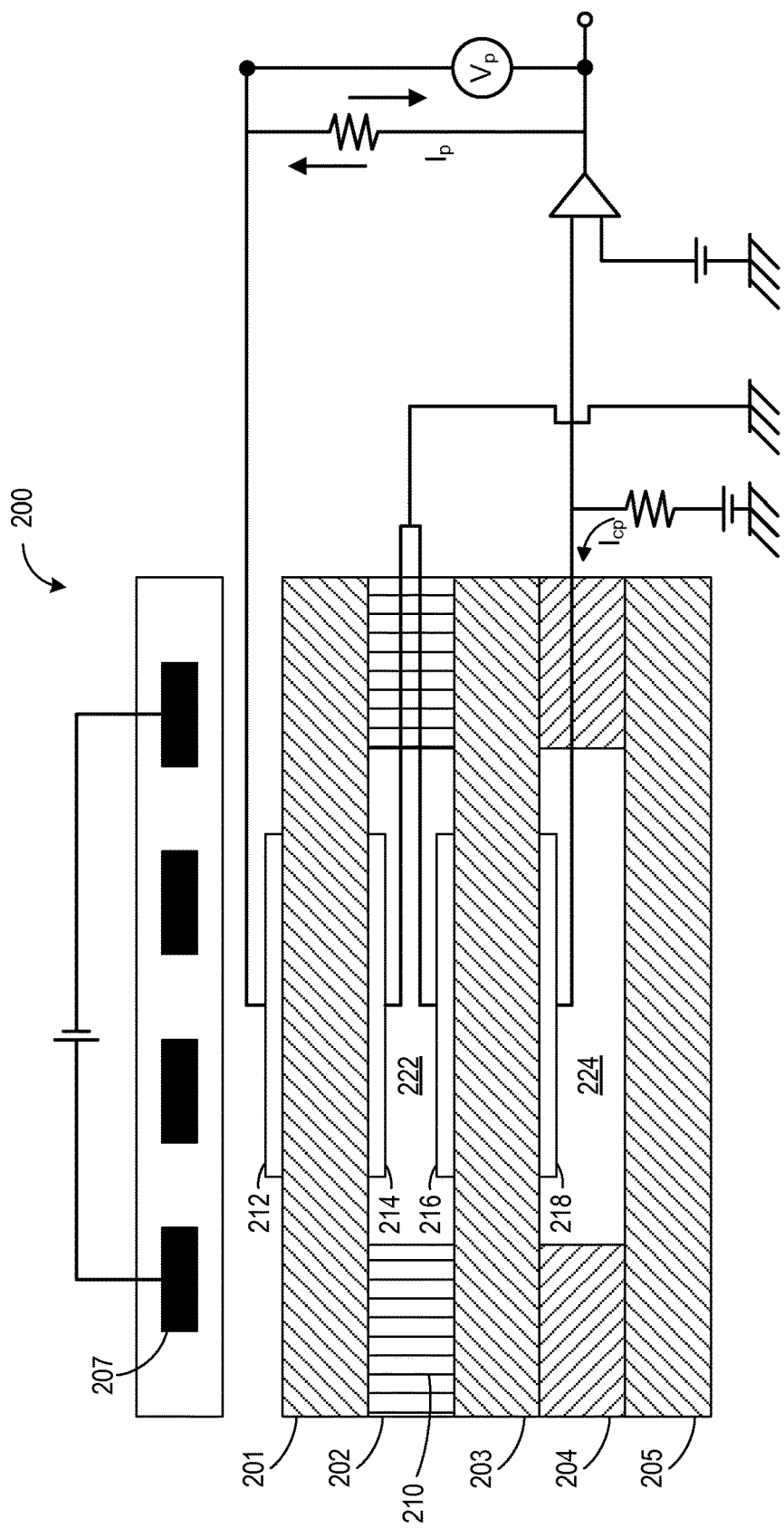
FIG. 2 shows a schematic diagram of an example UEGO sensor.

FIG. 1 is a schematic diagram showing one cylinder of a multi-cylinder engine 10 in an engine system 100. The engine system 100, may be coupled inside a propulsion system of an on road vehicle system 101. An air outside air temperature (OAT) sensor 127 is positioned on the exterior of the vehicle system 101. The OAT sensor estimates the ambient air temperature that is used for engine operations and in addition, OAT may be used to trigger humidity measurements corresponding to a change in ambient temperature. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. In addition, a change in IAT or air charge temperature (ACT) may be used as a trigger for humidity estimation using oxygen sensors or designated humidity sensors. Similarly, the BP sensor 128 estimates the ambient pressure for engine operations and provides a signal to the controller 12. A change in BP may be used to trigger humidity estimation. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. A detailed embodiment of the UEGO sensor is described with reference to FIG. 2. This sensor may be used for ambient humidity estimation under selected conditions. The engine system may include dedicated ambient humidity sensors for measurement of ambient humidity when a humidity estimation is triggered. A change in ambient temperature as measured or estimated from OAT 127 and/or IAT sensor 125 may be used as a trigger for humidity measurement. Similarly, a change in ambient pressure as estimated by the BP sensor 128 may trigger a humidity measurement. If a difference between the current ambient temperature or pressure and the ambient temperature or pressure at the last known humidity measurement is higher than a threshold, a humidity measurement may be triggered. The humidity sensors may be positioned at the intake passage 42 and/or at the exhaust passage 48 upstream of an emission control device 70. By actively sensing humidity during ambient conditions when humidity is expected to change, rather than (or in addition to) opportunistically sensing humidity when possible, a more accurate and reliable humidity estimate may be provided for engine control and also unnecessary humidity measurements may be avoided. The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. This oxygen sensor may be used for ambient humidity estimation under selected conditions. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. In addition, controller 12 may also receive signals from sensors located external to the vehicle system 101 such as the OAT sensor 127. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, the controller 12 initiates a humidity measurement using a humidity sensor or an oxygen sensor based on change in ambient conditions as estimated by temperature and pressure sensors. In another example, the controller 12 adjusts engine actuator(s), such as the EGR valve, in accordance with the estimated change in ambient humidity.

FIG. 2 shows a schematic view of an example embodiment of an exhaust gas oxygen sensor, such as UEGO sensor 200, configured to measure a concentration of oxygen ($O_2$) in an exhaust gas stream during fueling conditions. In one example, UEGO sensor 200 is an embodiment of UEGO sensor 126 of FIG. 1. It will be appreciated, however, that the sensor of FIG. 2 may alternatively represent an intake oxygen sensor, such as sensor 172 of FIG. 1. The exhaust gas oxygen sensor may also be used during non-fueling conditions to estimate an ambient humidity. Non-fueling conditions may include engine operating conditions in which the fuel supply is interrupted but the engine continues spinning and at least one intake valve and one exhaust valve are operating; such as a deceleration fuel shut off (DFSO) event. Thus, air may be flowing through one or more of the cylinders, but fuel is not injected in the cylinders. Under non-fueling conditions, combustion is not carried out and ambient air may move through the cylinder from the intake passage to the exhaust passage. In this way, a sensor, such as an exhaust gas oxygen sensor, may receive ambient air and ambient humidity may be estimated. In still other examples, an oxygen sensor disposed in the intake air passage (such as oxygen sensor 172 in FIG. 1), and/or a dedicated humidity sensor may be used to estimate ambient humidity during suitable conditions. A detailed description of humidity measurement using a similar oxygen sensor will be discussed in FIG. 4.

Sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments such as that shown in FIG. 2, a heater 207 may be disposed in thermal communication with the layers to increase the ionic conductivity of the layers. While the depicted UEGO sensor 200 is formed from five ceramic layers, it will be appreciated that the UEGO sensor may include other suitable numbers of ceramic layers.

The layer 202 includes a material or materials creating a diffusion path 210. The diffusion path 210 is configured to introduce exhaust gases into a first internal cavity 222 via diffusion. The diffusion path 210 may be configured to allow one or more components of exhaust gases, including but not limited to a desired analyte (e.g., $O_2$), to diffuse into the internal cavity 222 at a more limiting rate than the analyte can be pumped in or out by pumping electrodes pair 212 and 214. In this manner, a stoichiometric level of $O_2$ may be obtained in the first internal cavity 222.

The sensor 200 further includes a second internal cavity 224 within the layer 204 separated from the first internal cavity 222 by the layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping current $I_{cp}$. Herein, the second internal cavity 224 may be referred to as a reference cell.

A pair of sensing electrodes 216 and 218 is disposed in communication with first internal cavity 222 and the reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level.

The pair of pumping electrodes 212 and 214 is disposed in communication with the internal cavity 222, and is configured to electrochemically pump a selected gas constituent (e.g., $O_2$) from the internal cavity 222 through the layer 201 and out of the sensor 200. Alternatively, the pair of pumping electrodes 212 and 214 may be configured to electrochemically pump a selected gas through the layer 201 and into the internal cavity 222. Herein, the pumping electrodes pair 212 and 214 may be referred to as an $O_2$ pumping cell. The electrodes 212, 214, 216, and 218 may be made of various suitable materials. In some embodiments, the electrodes 212, 214, 216, and 218 may be at least partially made of a material that catalyzes the dissociation of molecular oxygen. Examples of such materials include, but are not limited to, electrodes containing platinum and/or gold.

The process of electrochemically pumping the oxygen out of or into the internal cavity 222 includes applying an electric current $I_p$ across the pumping electrodes pair 212 and 214. The pumping current $I_p$ applied to the $O_2$ pumping cell pumps oxygen into or out of the first internal cavity 222 in order to maintain a stoichiometric level of oxygen in the cavity pumping cell. The pumping current $I_p$ is proportional to the concentration of oxygen in the exhaust gas. Thus, a lean mixture will cause oxygen to be pumped out of the internal cavity 222 and a rich mixture will cause oxygen to be pumped into the internal cavity 222.

A control system (not shown in FIG. 2) generates the pumping voltage signal $V_p$ as a function of the intensity of the pumping current $I_p$ required to maintain a stoichiometric level within the first internal cavity 222.

It should be appreciated that the oxygen sensor described herein is merely an example embodiment of a UEGO sensor, and that other embodiments of intake or exhaust oxygen sensors may have additional and/ or alternative features and/or designs.

FIGS. 1 and 2 show example configurations of the oxygen sensor with relative positioning of the various components. The oxygen sensor depicted therein is one of an intake oxygen sensor coupled downstream of an intake throttle and an exhaust oxygen sensor coupled upstream of an emission control device. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 3:
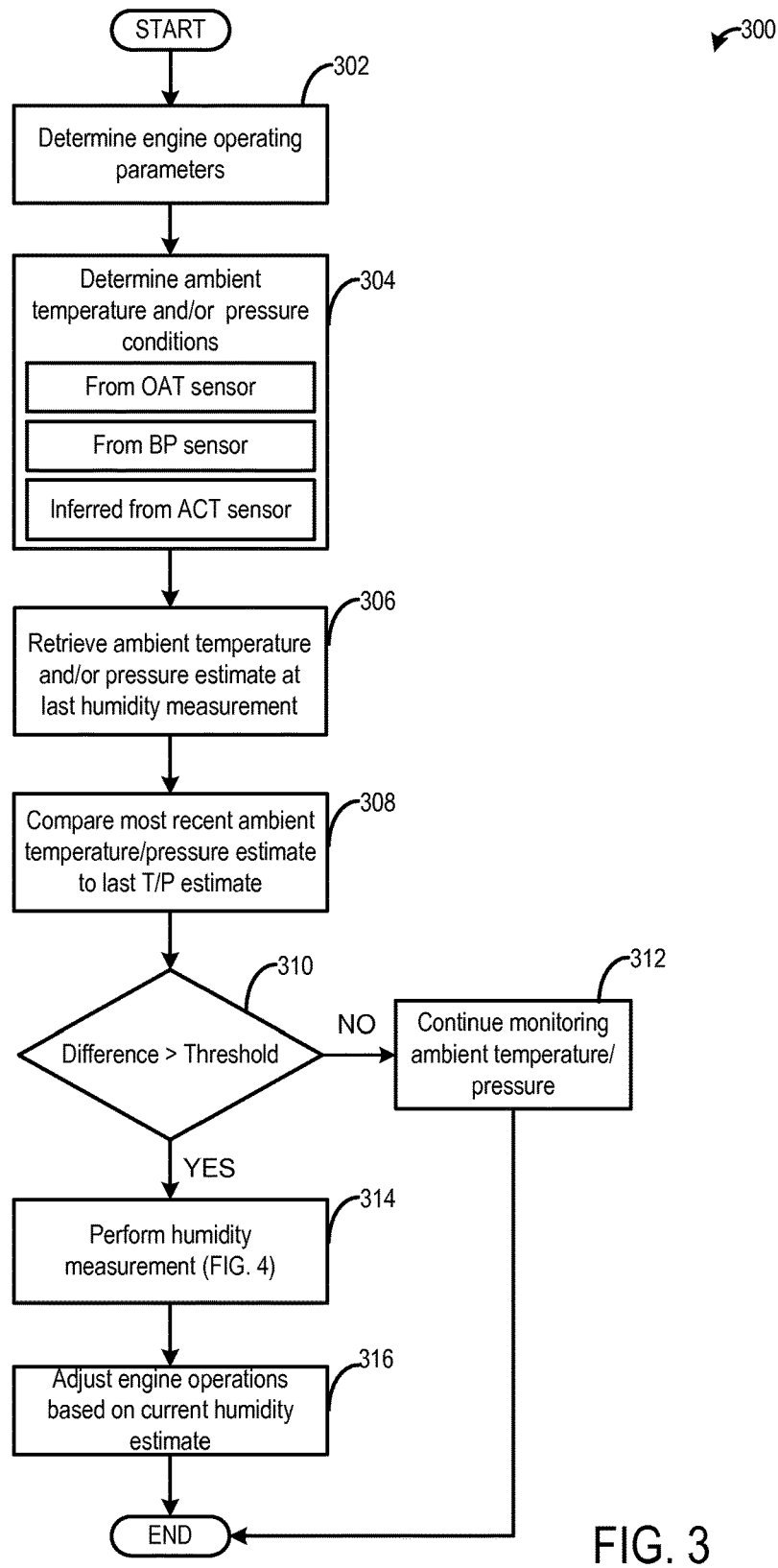
FIG. 3 is a flow chart illustrating a method that can be implemented to determine whether humidity measurement needs to be triggered.

FIG. 3 illustrates an example method 300 for determining conditions that trigger humidity sensing. In particular, the method determines whether humidity measurement needs to be carried out based on changes in ambient conditions. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, the routine includes estimating and/or measuring current engine operating parameters. Parameters assessed may include, for example, engine load, engine speed, vehicle speed, manifold vacuum, throttle position, spark timing, EGR flow, exhaust pressure, exhaust air/fuel ratio, etc.

At 304, the routine includes determining ambient temperature and pressure conditions. In one example, ambient temperature may be directly estimated as the outside air temperature (OAT) from an OAT sensor located on the exterior of the vehicle. In another example, ambient temperature may be inferred based on an air charge temperature (ACT) or an intake air temperature (IAT), as measured by an IAT sensor coupled to an engine intake passage. Ambient pressure may be estimated based on the output of a barometric pressure (BP) sensor coupled to the intake passage.

At 306, temperature and pressure readings from a last humidity measurement are retrieved from the memory of the engine controller. The last humidity measurement referred to herein may be an immediately last humidity measurement, wherein no further humidity sensing has occurred since that measurement. As such, the immediately last humidity measurement may have been previously measured and/or inferred from the OAT, IAT and/or BP sensors.

At 308, the most recent temperature and/or pressure estimates (determined at 304) are compared to the retrieved temperature or pressure estimates for the previous humidity measurement (as retrieved at 306). Further, a difference or change in temperature ($\Delta T$) or a difference in pressure ($\Delta P$) between the recent and the previously measured temperature and/or pressure is estimated.

At 310, the routine includes determining if the change in temperature ($\Delta T$) and/or the change in pressure ($\Delta P$) is greater than a pre-determined threshold value. A change in ambient temperature or pressure may be based on an absolute signal output by the above-mentioned sensors, or a change (or derivative) in the output of the sensors. The threshold value of change in ambient air temperature or pressure includes a threshold change since a last ambient humidity estimate (such as via the operating of an oxygen sensor). As such, a higher than threshold change in ambient temperature or pressure may indicate that the ambient humidity has also changed significantly. The threshold value may be adjusted as a function of the absolute ambient temperature or pressure. For example, the threshold value may be adjusted based on ambient temperature, the threshold decreased as the ambient temperature increases above an upper threshold or falls below a lower threshold. As an example, the threshold temperature difference may be smaller at higher temperatures, such as temperatures above 60° F., and at lower temperatures, such as temperatures below 30° F. The threshold temperature difference may have a larger value in the intermediate temperature range between the upper and lower threshold, such as between 30° F. and 60° F. In alternate examples, instead of an absolute change in temperature or pressure difference, it may be determined if the temperature or pressure has changed by more than a threshold change in percentage (%), wherein the threshold change in percentage may be similarly adjusted based upon the absolute ambient temperature or pressure.

If the change in temperature or pressure is lower than the threshold value the routine proceeds to 312, where the controller continues to monitor ambient temperature and pressure using the aforementioned sensors. Further, in response to the lower than the threshold change in air temperature (or pressure), the engine actuators are continued to be adjusted based on a previous ambient humidity estimate (specifically, the last humidity estimate, as retrieved at 306).

If the temperature or pressure difference is higher than the threshold value, the routine proceeds on to 314, where the controller (such as controller 12 of FIG. 1) sends a signal triggering a humidity measurement. In this way humidity sensing is triggered only when there is a change in ambient condition that correlates with a substantial change in ambient humidity. In one example, the controller sends a signal to a dedicated humidity sensor to estimate the ambient humidity. In another example, the controller sends a signal to the exhaust and/or intake oxygen sensor to perform a humidity measurement. The higher than threshold change in ambient air temperature is based on the output of one or more of the intake air temperature sensor coupled to an engine air intake passage, and an outside air temperature sensor coupled to the vehicle. In the same way, the higher than threshold change in ambient air pressure is based on the output of a barometric pressure sensor coupled to an engine air intake passage. The details of the humidity measurement procedure is discussed in FIG. 4.

Subsequent to detection of the ambient humidity (such as by an intake or exhaust oxygen sensor, or a dedicated humidity sensor), a plurality of engine operating parameters may be adjusted for improving engine performance, at 316. Adjusting engine operation includes, as non-limiting examples, adjusting one or more of an amount of exhaust gas recirculation, an amount of spark retard, a borderline spark value, and a fuel octane estimate. For example, an increase in water concentration of the air surrounding the vehicle may dilute a charge mixture delivered to a combustion chamber of the engine. If one or more operating parameters are not adjusted in response to the increase in humidity, engine performance and fuel economy may decrease and emissions may increase; thus, the overall efficiency of the engine may be reduced. In some embodiments, only one parameter may be adjusted responsive to the humidity. In other embodiments, any combination or sub combination of these operating parameters may be adjusted in response to measured fluctuations in ambient humidity.

In one example embodiment, an amount of EGR may be adjusted based on the measured ambient humidity. For example, the water concentration in the air surrounding the vehicle may have increased due to a drop in ambient temperature (such as due to a cold weather front). Thus, an increase in humidity may be detected by the exhaust gas oxygen sensor during engine non-fueling conditions. In response to the increased humidity, during subsequent engine fueling operation, the EGR flow into at least one combustion chamber may be reduced. As a result, engine efficiency may be maintained without degrading NOx emissions.

Responsive to a fluctuation in absolute ambient humidity, EGR flow may be increased or decreased in at least one combustion chamber. As such, the EGR flow may be increased or decreased in only one combustion chamber, in some combustion chambers, or in all combustion chambers. Furthermore, the magnitude of change of the EGR flow may be the same for all cylinders or the magnitude of change of the EGR flow may vary by cylinder based on the specific operating conditions of each cylinder.

In another embodiment, spark timing may be adjusted responsive to the ambient humidity. In at least one condition, for example, spark timing may be advanced in one or more cylinders during subsequent engine fueling operation responsive to a higher humidity reading. In another example, spark timing may be scheduled so as to reduce knock in low humidity conditions (e.g., retarded from a peak torque timing), for example. When an increase in humidity is detected via the humidity sensing, spark timing may be advanced in order to maintain engine performance and operate closer to or at a peak torque spark timing.

Additionally, spark timing may be retarded in response to a decrease in ambient humidity. For example, a decrease in ambient humidity from a higher humidity may cause knock. If the decrease in humidity is detected by an exhaust gas sensor during non-fueling conditions, such as DFSO, spark timing may be retarded during subsequent engine fueling operation and knock may be reduced. It should be noted that spark may be advanced or retarded in one or more cylinders during subsequent engine fueling operation. Further, the magnitude of change of spark timing may be the same for all cylinders or one or more cylinders may have varying magnitudes of spark advance or retard.

In still another example embodiment, exhaust gas air fuel ratio may be adjusted responsive to the measured ambient humidity during subsequent engine fueling operation. For example, an engine may be operating with a lean air fuel ratio (relative to stoichiometry) optimized for low humidity. In the event of an increase in humidity, the mixture may become diluted, resulting in engine misfire. If the increase in humidity is detected by the exhaust gas sensor during non-fueling conditions, however, the air fuel ratio may be adjusted so that the engine will operate with a less lean, lean air fuel ratio during subsequent fueling operation. Likewise, an air fuel ratio may be adjusted to be a more lean (than stoichiometry), lean air fuel ratio during subsequent engine fueling operation in response to a measured decrease in ambient humidity. In this way, conditions such as engine misfire due to humidity fluctuations may be reduced. In some examples, an engine may be operating with a stoichiometric air fuel ratio or a rich air fuel ratio. As such, the air fuel ratio may be independent of ambient humidity and measured fluctuations in humidity may not result in an adjustment of air fuel ratio.

In this way, changes in ambient conditions, e.g., temperature and pressure, that influence humidity, may be used to trigger humidity measurement. In addition to the ambient conditions discussed, other parameters may also be used to trigger a humidity measurement. For example, if the time elapsed since the last humidity measurement is higher than a threshold value, a new humidity measurement may be initiated. As yet another example, a new humidity measurement may be triggered once a specific (threshold) distance has been traveled by a vehicle since a last humidity measurement was performed. Following a humidity measurement, engine operating parameters may be adjusted responsive to an ambient humidity estimate generated by an oxygen sensor coupled to an engine exhaust system or an air intake passage and/or a dedicated humidity sensor.

Figure 4:
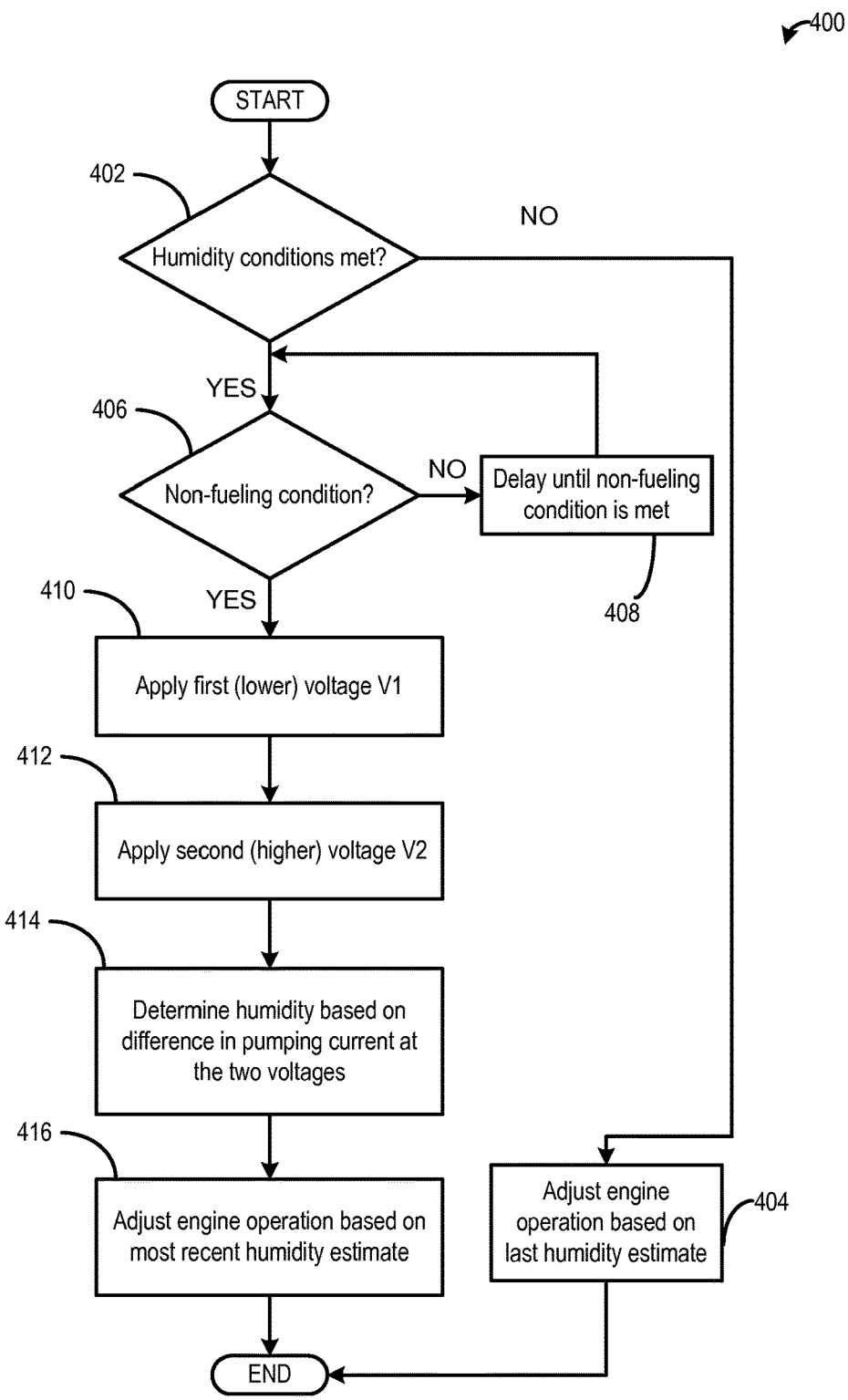
FIG. 4 is a flow chart illustrating a method to estimate humidity using an oxygen sensor.
Figure 5:
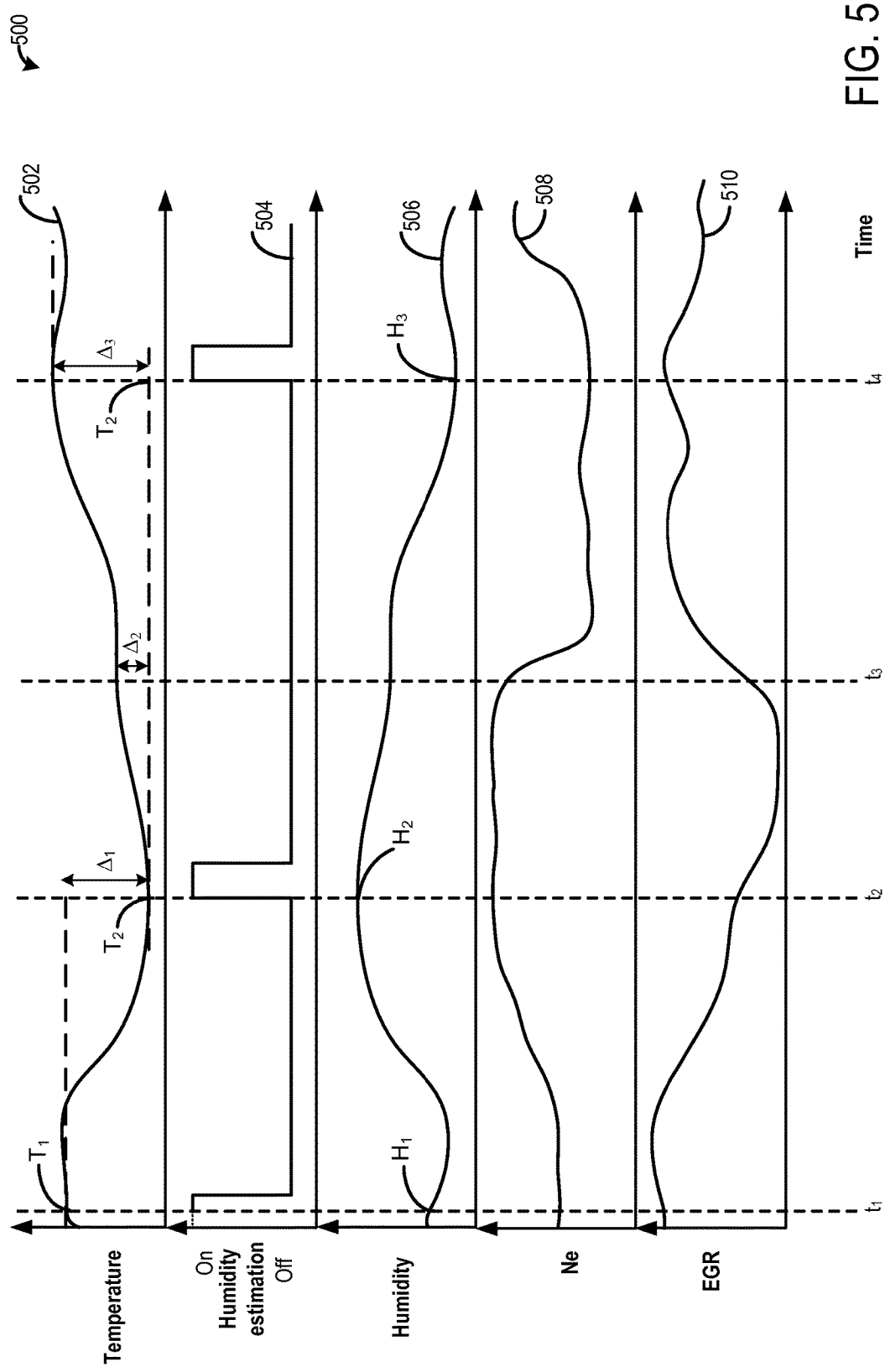
FIG. 5 shows an example triggering of humidity measurement based on changes in ambient temperature.

FIG. 4 illustrates an example method 400 for estimating ambient humidity using an oxygen sensor, such as a sensor described above in reference to FIG. 2 and positioned as shown in FIG. 1. The oxygen sensor used may be an exhaust gas oxygen sensor, and operating the oxygen sensor to update an ambient humidity estimate includes alternating between applying first and second voltages to the exhaust gas sensor during an engine non-fueling condition, and generating an indication of ambient humidity based on sensor outputs at the first and second voltages. In case the oxygen sensor is an intake gas oxygen sensor, operating the oxygen sensor to update an ambient humidity estimate includes alternating between applying first and second voltages to the exhaust gas sensor during conditions when each of boost, EGR, canister purge, and crankcase ventilation are disabled, and generating an indication of ambient humidity based on sensor outputs at the first and second voltages.

At 402, it is determined whether the humidity measurement conditions are met as discussed above in method 300, with reference to FIG. 3. The conditions triggering a humidity measurement may include a change in ambient temperature and/or change in ambient pressure from the temperature and pressure at a last humidity measurement being higher than a threshold. Humidity measurement conditions may further include a threshold time of engine operation or distance of vehicle travel elapsed since the last humidity measurement.

If the humidity measurement conditions are not met, a new humidity measurement is not carried out. In that case, at 404, the engine continues to adjust its operations based on the humidity estimate from the last humidity measurement. Once, the humidity measurement conditions are met, at 406, it is determined if a non-fueling condition is satisfied. Non-fueling conditions includes a deceleration fuel shut-off event wherein at least one intake valve and one exhaust valve are pumping air. As described before, a non-fueling condition is required for the exhaust UEGO to successfully estimate ambient humidity. If non-fueling conditions are not met, at 408, the humidity measurement is delayed until the non-fueling condition is satisfied. During this time, the engine continues to use the last humidity estimate to adjust its operations. If the non-fueling conditions are satisfied, humidity measurement is carried out by the exhaust gas oxygen sensor.

If an exhaust passage UEGO sensor is used for humidity measurement, it is advisable to wait for a certain specified duration since fuel shut off until the exhaust is substantially free of hydrocarbons from combustion in the engine, before the humidity measurement is commenced. For example, residual gases from one or more previous combustion cycles may remain in the exhaust for several cycles after fuel is shut off and the gas that is exhausted from the chamber may contain more than ambient air for a duration after fuel injection is stopped. In some examples, the duration since fuel shut off may be a time since fuel shut off. In other examples, the duration since fuel shut off may be a number of engine cycles since fuel shut off, for example.

For measuring humidity of the air in the passage, the sensor modulates the reference voltage across the pumping cell between a first voltage and a second voltage. At 410, a first (lower) pumping voltage may be applied. As one non-limiting example, the first voltage may be 450 mV. At 450 mV, for example, the pumping current may be indicative of an amount of oxygen in the exhaust gas. At this voltage, the water molecules remain intact and does not contribute towards the total oxygen present in the system. At, 412, a second (higher) pumping voltage may be applied. As one non-limiting example, the second voltage may be 950 mV. At the higher voltage, water molecules may be dissociated. The second voltage is higher than the first voltage, wherein the second voltage dissociates water molecules and the first voltage does not, and wherein the sensor outputs include a first pumping current generated responsive to applying the first voltage and a second pumping current generated responsive to applying the second voltage. Once the water molecules are dissociated due to the second voltage, the total oxygen concentration increases. The pumping current is indicative of the amount of oxygen in the exhaust gas plus an added amount of oxygen from dissociated water molecules. For example, the first voltage may be a voltage at which a concentration of oxygen in the exhaust gas may be determined, while the second voltage may be a voltage at which water molecules may be dissociated, enabling estimation of humidity.

At 414, a change in pumping current during the voltage modulation is determined. The indication of ambient humidity is generated based on a difference between the first and second pumping current generated upon applying the first and second voltages, respectively. The difference (delta) in pumping current at the first reference voltage and the pumping current at the second reference voltage is determined. The delta pumping current may be averaged over the duration of the DFSO condition such that an ambient humidity may be determined. Once the average change in pumping current is determined, based on that, an estimation of ambient humidity is determined. Subsequent to estimation of ambient humidity, at 416, a plurality of engine operations may be adjusted as described above in relation to FIG. 3.

In this way, during a first condition, responsive to a first change in ambient conditions, a first ambient humidity value previously estimated by a sensor is maintained and engine operation is adjusted based on the first humidity value; and during a second condition, responsive to a second change in ambient conditions, a second ambient humidity value is estimated via the sensor and adjusting engine operation responsive to the second ambient humidity value. During the second condition, engine operation is not adjusted responsive to the first ambient humidity value. Herein, the first change in ambient conditions includes a first change in ambient temperature or pressure, and the second change in ambient conditions includes a second change in ambient temperature or pressure, the second change larger than the first change. Ambient humidity may be estimated by operating an oxygen sensor in at least two modes in which the pumping voltage is regulated and the corresponding pumping currents are monitored to determine ambient humidity.

FIG. 5 shows an example operating sequence 500 illustrating humidity measurement based on temperature difference and corresponding engine operations adjustments. The horizontal (x-axis) denotes time and the vertical markers $t_1$-$t_4$ identify significant times in the measurement of ambient humidity.

The first plot from the top shows variation in ambient temperature (line 502) over time. Temperature values at which humidity measurements are carried out are marked by $T_1$, $T_2$ and $T_3$. The differences in temperature between current temperature and temperature at previous humidity measurement are shown by $\Delta_1$, $\Delta_2$ and $\Delta_3$. The second plot (line 504) indicates the occurrence of humidity estimation by modulating the reference voltage of the oxygen sensor. When the plot shows the ON position humidity measurement is being carried out and when the plot shows OFF position the sensor does not carry out humidity estimation. The third plot, line 506, shows the variation in ambient humidity over time. The humidity measurement is performed at specific times based on ambient temperature variation, the values of measured humidity shown by $H_1$, $H_2$ and $H_3$. The fourth plot (line 508) shows the change in engine speed (Ne) over time. The last plot (line 510) shows regulation of EGR flow based on engine speed and humidity estimate.

Prior to t1, humidity estimation is initiated. The humidity estimation may be triggered due to a request for ambient humidity estimation, or due a threshold duration or distance of vehicle travel having elapsed. At time $t_1$, humidity estimation is still being carried out as shown by the ON position of plot 504. The humidity estimation is completed shortly after tl, as indicated by the OFF position of plot 504. The ambient temperature at the time of this humidity sensing, such as at $t_1$, is shown as $T_1$. This temperature value, $T_1$ is recorded as the temperature corresponding to a humidity measurement $H_1$ (referred to as first humidity measurement in this example). Prior to this point the EGR flow is regulated based on the last measured humidity value together with engine speed. Humidity measurement is carried out by an oxygen sensor based on modulation of pumping voltage and measurement of corresponding pumping currents. Once the humidity estimation is completed shortly after $t_1$, the humidity value to be used to regulate engine operation parameters is updated to the current humidity value, $H_1$.

Immediately after $t_1$, there is no significant variation in engine speed, however due to the lower value of humidity $H_1$, the EGR flow is increased to provide a desired level of engine dilution. During the time interval between $t_1$ and $t_2$, when engine speed transiently increases, the EGR flow is correspondingly reduced.

Between $t_1$ and $t_2$, the humidity value is considered to be constant at $H_1$. During this time interval $t_1$-$t_2$, ambient temperature is continuously monitored and compared to the temperature at the first humidity measurement, $T_1$.

At time $t_2$, the temperature difference between the current temperature ($T_2$) and $T_1$, $\Delta_1$, is higher than a threshold value. The threshold may change based on the temperature at that instant, for example, the threshold may decrease as the ambient temperature increases above an upper threshold or falls below a lower threshold. At $t_2$, in response to $\Delta_1$ being higher than the threshold value, a humidity measurement is triggered at time $t_2$ and temperature $T_2$. This value of temperature, $T_2$, is recorded as the temperature corresponding to the most recent humidity measurement (referred to as second humidity measurement in this example). Post humidity estimation at $t_2$, the humidity value used for engine operations is updated to $H_2$, which is higher than the previous value $H_1$. Consequently, post $t_2$, the EGR flow is lowered to compensate for the increased humidity while enabling a given engine dilution level to be maintained (since there is no significant change in engine speed).

Between time $t_2$ and $t_3$, engine speed remains largely constant and the EGR flow once adjusted to a lower value corresponding to an increased humidity $H_1$, also remains largely constant. During this time interval $t_2$-$t_3$, temperature is continuously monitored and compared to the temperature at the second humidity measurement, $T_2$ and the difference in temperature is compared to the threshold temperature difference.

Post time $t_2$, the temperature continues to increase compared to $T_2$ and the difference in temperature between the current temperature and $T_2$ is compared to the threshold temperature difference. At time, $t_3$, the temperature difference between the current temperature and $T_2$ is $\Delta_2$. However, $\Delta_2$ is smaller than the threshold temperature difference and therefore a humidity measurement is not triggered even though there is a change in temperature compared to $T_2$. Hence, the last estimated humidity value $H_2$ is continued to be used for all engine operations. In the time interval t3 and t4, the engine speed decreases, consequently, the EGR flow is increased given that the humidity value is considered to remain constant at $H_2$. The change in EGR between $t_3$ and $t_4$, is primarily governed by fluctuations in engine speed. During this time interval $t_2$-$t_4$, there is no humidity measurement, the humidity value, $H_2$ is used for engine operations and the temperature is continuously monitored and compared to the temperature at the second humidity measurement, $T_2$ and the difference in temperature is compared to the threshold temperature difference.

At time $t_4$, the temperature difference between the current temperature ($T_3$) and $T_2$, $\Delta_3$, is higher than the threshold value. As $\Delta_3$ is higher than the threshold value for that temperature range, consequently, a humidity measurement is triggered at temperature $T_3$. This value of temperature, $T_3$, is recorded as the temperature corresponding to the recent humidity measurement (referred to as third humidity measurement in this example). Post humidity estimation at $t_4$, the humidity value used for engine operations is updated to $H_3$, which is lower compared to the previous value $H_2$. Consequently, post $t_4$, the EGR flow is regulated to increase with the lowering of ambient humidity. The EGR flow is also governed by the fluctuations in engine speed and as the engine speed starts to increase, the EGR flow is lowered. Thus, engine operation parameters e.g. EGR flow are varied based on humidity and other governing factors.

In this way, variation in ambient temperature between current temperature and temperature at previous humidity measurement is compared to a threshold temperature difference; and if this temperature difference is higher than a threshold value, a new humidity measurement is triggered. Based on an updated humidity estimation engine operations e.g., EGR flow may be modulated. In the same way, a threshold pressure difference since a last humidity measurement, a time elapsed since a last measurement and/or distance travelled since a last measurement may additionally or alternatively be used to trigger humidity sensing.

In one example, a method for humidity estimation comprises, in response to a higher than threshold change in ambient air temperature or pressure, operating an oxygen sensor to update an ambient humidity estimate; and adjusting an engine actuator based on the updated ambient humidity estimate. The preceding example method may additionally or optionally further comprise, in response to a lower than the threshold change in air temperature, adjusting the engine actuator based on a previous ambient humidity estimate. In any or all of the preceding examples, the higher than threshold change in ambient air temperature may be additionally or optionally based on the output of one or more of an intake air temperature sensor coupled to an engine air intake passage, and an outside air temperature sensor coupled to the vehicle. In any or all of the preceding examples, the higher than threshold change in ambient air pressure may be additionally or optionally based on the output of a barometric pressure sensor coupled to an engine air intake passage. In any or all of the preceding examples, the threshold change in ambient air temperature or pressure may additionally or optionally include a threshold change since a last ambient humidity estimate via the operating of the oxygen sensor. In any or all of the preceding examples, the threshold may be additionally or optionally adjusted based on ambient temperature, the threshold decreased as the ambient temperature increases above an upper threshold or falls below a lower threshold. In any or all of the preceding examples, the oxygen sensor may additionally or optionally be one of an intake oxygen sensor coupled downstream of an intake throttle and an exhaust oxygen sensor coupled upstream of an emission control device. In any or all of the preceding examples, where the oxygen sensor is an exhaust gas oxygen sensor, operating the oxygen sensor to update an ambient humidity estimate may additionally or optionally include alternating between applying first and second voltages to the exhaust gas sensor during an engine non-fueling condition, and generating an indication of ambient humidity based on sensor outputs at the first and second voltages. In any or all of the preceding examples, non-fueling conditions may additionally or optionally include a deceleration fuel shut-off event wherein at least one intake valve and one exhaust valve are pumping air, wherein the second voltage is higher than the first voltage, wherein the second voltage dissociates water molecules and the first voltage does not, and wherein the sensor outputs include a first pumping current generated responsive to applying the first voltage and a second pumping current generated responsive to applying the second voltage. In any or all of the preceding examples, where the oxygen sensor is an intake gas oxygen sensor, operating the oxygen sensor to update an ambient humidity estimate may additionally or optionally include alternating between applying first and second voltages to the exhaust gas sensor during conditions when each of boost, EGR, canister purge, and crankcase ventilation are disabled, and generating an indication of ambient humidity based on sensor outputs at the first and second voltages. In any or all of the preceding examples, additionally or optionally, the second voltage is higher than the first voltage, wherein the second voltage dissociates water molecules and the first voltage does not, wherein the sensor outputs include a first pumping current generated responsive to applying the first voltage and a second pumping current generated responsive to applying the second voltage, and wherein the indication of ambient humidity is generated based on a difference between the first and second pumping current.

Another example method for humidity estimation comprises, during a first condition, responsive to a first change in ambient conditions, maintaining a first ambient humidity value previously estimated by a sensor and adjusting engine operation based on the first humidity value; and during a second condition, responsive to a second change in ambient conditions, estimating a second ambient humidity value via the sensor and adjusting engine operation responsive to the second ambient humidity value. In the preceding example, the first change in ambient conditions additionally or optionally includes a first change in ambient temperature or pressure, and the second change in ambient conditions includes a second change in ambient temperature or pressure, the second change larger than the first change. In any or all of the preceding examples, during the second condition, additionally or optionally, engine operation is not adjusted responsive to the first ambient humidity value. Adjusting engine operation additionally or optionally includes adjusting one or more of an amount of exhaust gas recirculation, an amount of spark retard, borderline spark, and a fuel octane estimate. In any or all of the preceding examples, the sensor is one of an intake oxygen sensor, an exhaust gas oxygen sensor, and a humidity sensor.

In yet another example, a vehicle system comprises an engine including an intake and an exhaust; an oxygen sensor coupled to the engine exhaust; an EGR passage including an EGR valve for recirculating exhaust gas from the engine exhaust to the engine intake; an outside air temperature sensor for estimating an ambient air temperature; and a controller with computer readable instructions stored on non-transitory memory for: modulating a reference voltage of the oxygen sensor to perform a first estimation of ambient humidity; learning the ambient air temperature at the first estimation of ambient humidity; and in response to a higher than threshold change in the ambient temperature since the learning, modulating the reference voltage of the oxygen sensor to perform a second estimation of ambient humidity. In the preceding example, additionally or optionally, the controller includes further instructions for: in response to a lower than threshold change in the ambient temperature since the learning, adjusting the opening of the EGR valve based on the first estimation of ambient humidity; and in response to the higher than threshold change in the ambient temperature since the learning, adjusting the opening of the EGR valve based on the second estimation of ambient humidity. In any or all of the preceding examples, modulating the reference voltage of the oxygen sensor to perform the first and second estimation additionally or alternatively includes modulating the reference voltage between a first, lower and a second, higher reference voltage during deceleration fuel shut-off conditions, and performing the first and second estimation based on a change in pumping current following the modulating. In any or all of the preceding examples, additionally or alternatively, the controller includes further instructions for: in response to elapse of a higher than threshold duration since the first estimation, modulating the reference voltage of the oxygen sensor to perform the second estimation of ambient humidity.

In this way, humidity estimation may be triggered by changes in ambient conditions that may influence ambient humidity. Ambient conditions such as temperature, and pressure are actively monitored and humidity estimation is selectively carried out during conditions when humidity is expected to change significantly, rather than (or in addition to) opportunistically sensing humidity when possible. Therefore, a more accurate and reliable humidity estimate may be provided for engine control. Engine operations are suitably adjusted based on updated humidity estimates. The technical effect of using a change in ambient temperature and pressure, along with other conditions, to trigger humidity measurement is that a humidity estimate can be updated when a substantial change in ambient humidity is expected, reducing any unnecessary humidity measurements. In addition, in engine systems where an oxygen sensor is used for humidity estimation, the selective sensing of humidity when the specific trigger conditions are met decreases the chances of sensor degradation due to blackening from frequent application of a variable voltage during unnecessary humidity measurements, thereby increasing component life. Engine operations can be improved by using a more reliable and up-to-date humidity estimate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine, comprising:
in response to a higher than threshold change in ambient air temperature or pressure,
operating an oxygen sensor to update an ambient humidity estimate; and
adjusting an engine actuator based on the updated ambient humidity estimate,
wherein the oxygen sensor is an intake gas oxygen sensor, and wherein operating the oxygen sensor to update the ambient humidity estimate includes alternating between applying first and second voltages to the intake gas oxygen sensor during conditions when each of boost, EGR, canister purge, and crankcase ventilation is disabled, and generating an indication of ambient humidity based on sensor outputs at the first and second voltages.

2. The method of claim 1, further comprising, in response to a lower than threshold change in ambient air temperature, adjusting the engine actuator based on a previous ambient humidity estimate.

3. The method of claim 1, wherein the higher than threshold change in ambient air temperature is based on output of one or more of an intake air temperature sensor coupled to an engine air intake passage, and an outside air temperature sensor coupled to an exterior of the vehicle.

4. The method of claim 1, wherein the higher than threshold change in ambient air pressure is based on output of a barometric pressure sensor coupled to an engine air intake passage.

5. The method of claim 1, wherein the threshold change in ambient air temperature or pressure includes a threshold change since a last ambient humidity estimate via the operating of the oxygen sensor.

6. The method of claim 1, wherein the oxygen sensor is coupled downstream of an intake throttle and an exhaust oxygen sensor is coupled upstream of an emission control device.

7. The method of claim 1, wherein the oxygen sensor is an exhaust gas oxygen sensor, and wherein operating the oxygen sensor to update the ambient humidity estimate includes alternating between applying first and second voltages to the exhaust gas oxygen sensor during an engine non-fueling condition, and generating an indication of ambient humidity based on sensor outputs at the first and second voltages.

8. The method of claim 7, wherein the non-fueling condition includes a deceleration fuel shut-off event wherein at least one intake valve and one exhaust valve are pumping air, wherein the second voltage is higher than the first voltage, wherein the second voltage dissociates water molecules and the first voltage does not, and wherein the exhaust gas oxygen sensor outputs include a first pumping current generated responsive to applying the first voltage and a second pumping current generated responsive to applying the second voltage.

9. The method of claim 7, wherein the second voltage is higher than the first voltage, and wherein the second voltage dissociates water molecules and the first voltage does not, wherein the exhaust gas oxygen sensor outputs include a first pumping current generated responsive to applying the first voltage and a second pumping current generated responsive to applying the second voltage, and wherein the indication of ambient humidity is generated based on a difference between the first and second pumping currents.

10. A method for an engine, comprising:
during a first condition, responsive to a first change in ambient conditions that is less than a threshold, maintaining a first ambient humidity value previously estimated by a sensor, and adjusting engine operation based on the first ambient humidity value; and
during a second condition, responsive to a second change in ambient conditions that is greater than the threshold, estimating a second ambient humidity value via the sensor, and adjusting engine operation responsive to the second ambient humidity value, wherein the threshold is adjusted based on ambient temperature, the threshold decreased as the ambient temperature increases above an upper threshold or falls below a lower threshold.

11. The method of claim 10, wherein the first change in ambient conditions includes a first change in the ambient temperature or an ambient pressure, and the second change in ambient conditions includes a second change in the ambient temperature or the ambient pressure, the second change larger than the first change.

12. The method of claim 10, wherein during the second condition, engine operation is not adjusted responsive to the first ambient humidity value.

13. The method of claim 10, wherein adjusting engine operation includes adjusting an amount of exhaust gas recirculation, an amount of spark retard, and borderline spark.

14. The method of claim 10, wherein the first change in ambient conditions is a first change in ambient pressure, and where the second change in ambient conditions is a second change in ambient pressure, the first and second changes in ambient pressure based on output from a barometric pressure sensor, the barometric pressure sensor coupled to an engine air intake passage.

15. A vehicle system, comprising:
- an engine including an intake and an exhaust;
- an oxygen sensor coupled to the engine exhaust;
- an EGR passage including an EGR valve for recirculating exhaust gas from the engine exhaust to the engine intake;
- an outside air temperature sensor for estimating an ambient air temperature; and
- a controller with computer readable instructions stored on non-transitory memory for:
  - modulating a reference voltage of the oxygen sensor to perform a first estimation of ambient humidity;
  - learning the ambient air temperature at the first estimation of ambient humidity; and
  - in response to a higher than threshold change in the ambient temperature since the learning,
    - modulating the reference voltage of the oxygen sensor to perform a second estimation of ambient humidity, wherein the threshold is adjusted based on the ambient air temperature, the threshold decreased as the ambient air temperature increases above an upper threshold or falls below a lower threshold.

16. The system of claim 15, wherein the controller includes further instructions for:
- in response to a lower than threshold change in the ambient temperature since the learning, adjusting an opening of the EGR valve based on the first estimation of ambient humidity; and
- in response to the higher than threshold change in the ambient temperature since the learning, adjusting the opening of the EGR valve based on the second estimation of ambient humidity.

17. The system of claim 15, wherein modulating the reference voltage of the oxygen sensor to perform the first and second estimations includes modulating the reference voltage between a first, lower and a second, higher reference voltage during deceleration fuel shut-off conditions, and performing the first and second estimations based on a change in pumping current following the modulating.

18. The system of claim 15, wherein the controller includes further instructions for:
- in response to elapse of a higher than threshold duration since the first estimation, modulating the reference voltage of the oxygen sensor to perform the second estimation of ambient humidity.

* * * * *